United States Patent
Shebanow et al.

(10) Patent No.: US 8,700,877 B2
(45) Date of Patent: Apr. 15, 2014

(54) ADDRESS MAPPING FOR A PARALLEL THREAD PROCESSOR

(75) Inventors: Michael C. Shebanow, Saratoga, CA (US); Yan Yan Tang, San Jose, CA (US); John R. Nickolls, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 551 days.

(21) Appl. No.: 12/890,518

(22) Filed: Sep. 24, 2010

(65) Prior Publication Data

US 2011/0078689 A1 Mar. 31, 2011

Related U.S. Application Data

(60) Provisional application No. 61/246,073, filed on Sep. 25, 2009.

(51) Int. Cl.
*G06F 12/00* (2006.01)
*G06F 13/00* (2006.01)
*G06F 13/28* (2006.01)

(52) U.S. Cl.
USPC ............ 711/200; 711/202; 711/203; 711/220

(58) Field of Classification Search
USPC .................. 711/200, 202, 203, 220
See application file for complete search history.

(56) References Cited

U.S. PATENT DOCUMENTS

| | | | | |
|---|---|---|---|---|
| 5,845,129 A | * | 12/1998 | Wendorf et al. | 710/200 |
| 7,240,169 B2 | * | 7/2007 | Dennie | 711/153 |
| 7,386,702 B2 | * | 6/2008 | Schreter | 711/220 |

* cited by examiner

*Primary Examiner* — Stephen Elmore
*Assistant Examiner* — Mark Giardino, Jr.
(74) *Attorney, Agent, or Firm* — Patterson + Sheridan, L.L.P.

(57) ABSTRACT

A method for thread address mapping in a parallel thread processor. The method includes receiving a thread address associated with a first thread in a thread group; computing an effective address based on a location of the thread address within a local window of a thread address space; computing a thread group address in an address space associated with the thread group based on the effective address and a thread identifier associated with a first thread; and computing a virtual address associated with the first thread based on the thread group address and a thread group identifier, where the virtual address is used to access a location in a memory associated with the thread address to load or store data.

20 Claims, 10 Drawing Sheets

ADDRESS MAPPING FOR A PARALLEL THREAD PROCESSOR

CROSS-REFERENCE TO RELATED APPLICATIONS

This application claims benefit of U.S. provisional patent application Ser. No. 61/246,073, filed on Sep. 25, 2009.

BACKGROUND

1. Field of the Invention

Embodiments of the invention relate generally to address mapping and, more specifically, to thread address mapping for a parallel thread processor.

2. Description of the Related Art

Performance requirements are constantly increasing in data processing systems. Multiple processing units may be configured to operate in parallel by the execution of multiple parallel threads. For some applications, the multiple parallel threads execute independently. For other applications, the multiple parallel threads share some data. For example, a first thread may compute an input that is used by one or more other threads. The threads may be organized in groups called cooperative thread arrays (CTAs), where data is shared among the threads of each CTA, but not between CTAs. Finally, a parallel thread processor may group multiple parallel threads together in thread groups called warps, using single-instruction multiple-thread (SIMT) or SIMD techniques.

Multithreaded parallel programs written using a programming model such as the CUDA™ C (general purpose parallel computing architecture) and PTX™ (a parallel thread execution instruction set architecture) provided by NVIDIA® access two or more distinct memory address spaces each having a different parallel scope, e.g., per-thread private local memory, per-CTA shared memory, and per-application global memory. The programmer specifies the memory address space in each variable declaration and typically uses a load and store instruction specific to that memory address space when accessing the variable. For example, three different sets of load/store memory access instructions may be used to access three distinct memory spaces that have different parallel sharing scope. A first set of load/store memory access instructions may be used to access thread-local memory that is private to each thread. A second set of load/store memory access instructions may be used to access shared memory that is shared between all threads in the same CTA. A third set of load/store memory access instructions may be used to access global memory that is shared by all threads in all CTAs. However, requiring programs to provide separate instruction sequences that depend on the type of memory that is being accessed is highly inefficient.

Accordingly, what is needed in the art is a technique that enables a program to use a common load or store instruction to access memory spaces that each have a different scope.

SUMMARY

One embodiment of the invention provides a method for thread address mapping in a parallel thread processor. The method includes receiving a thread address associated with a first thread in a thread group; computing an effective address based on a location of the thread address within a local window of a thread address space; computing a thread group address in an address space associated with the thread group based on the effective address and a thread identifier associated with a first thread; and computing a virtual address associated with the first thread based on the thread group address and a thread group identifier, where the virtual address is used to access a location in a memory associated with the thread address to load or store data.

Advantageously, unifying the addressing of multiple distinct parallel memory spaces into a single address space enables the use of a single type of load or store instruction instead of multiple different types of load and store instruction for each of the distinct parallel memory spaces. It enables parallel thread processors having multiple different address spaces to be programmed efficiently with conventional single-thread programming languages such as C that assume a single memory address space and a single type of pointer address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one skilled in the art that the present invention may be practiced without one or more of these specific details. In other instances, well-known features have not been described in order to avoid obscuring the present invention.

System Overview

Figure 1:
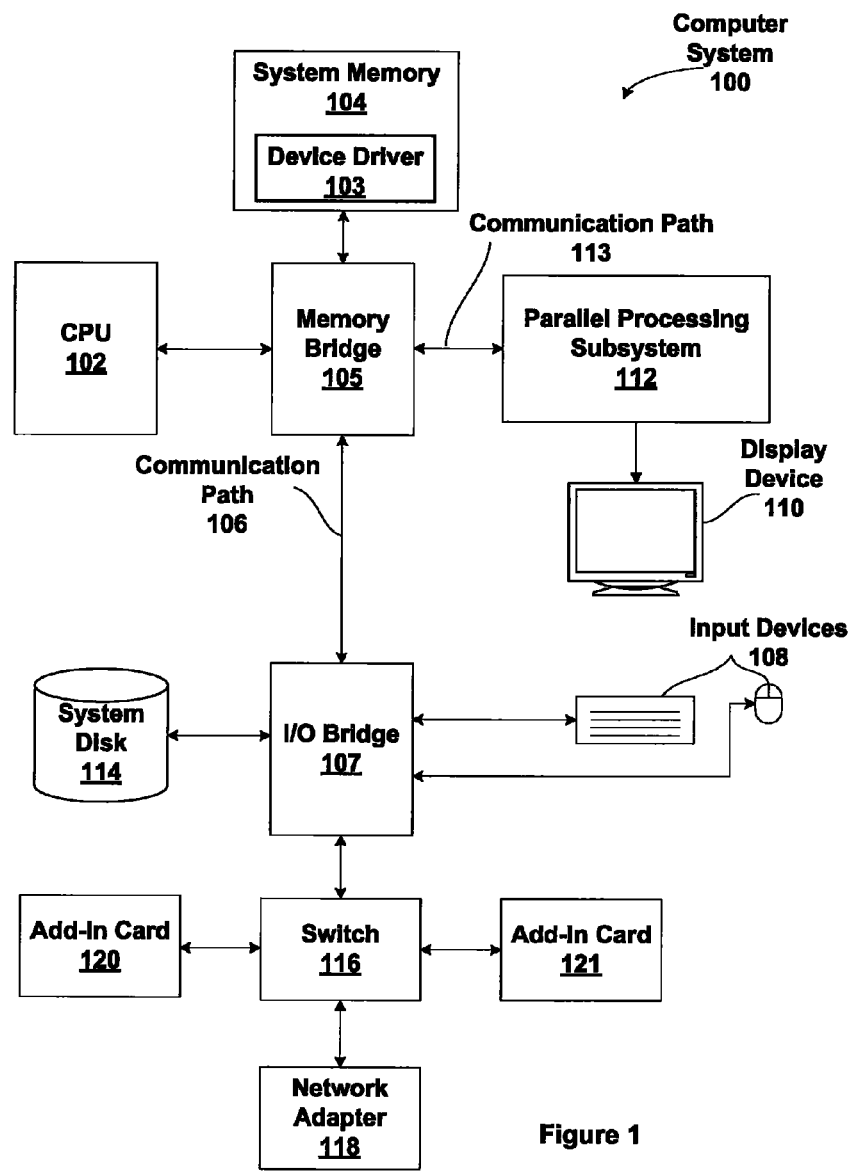
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
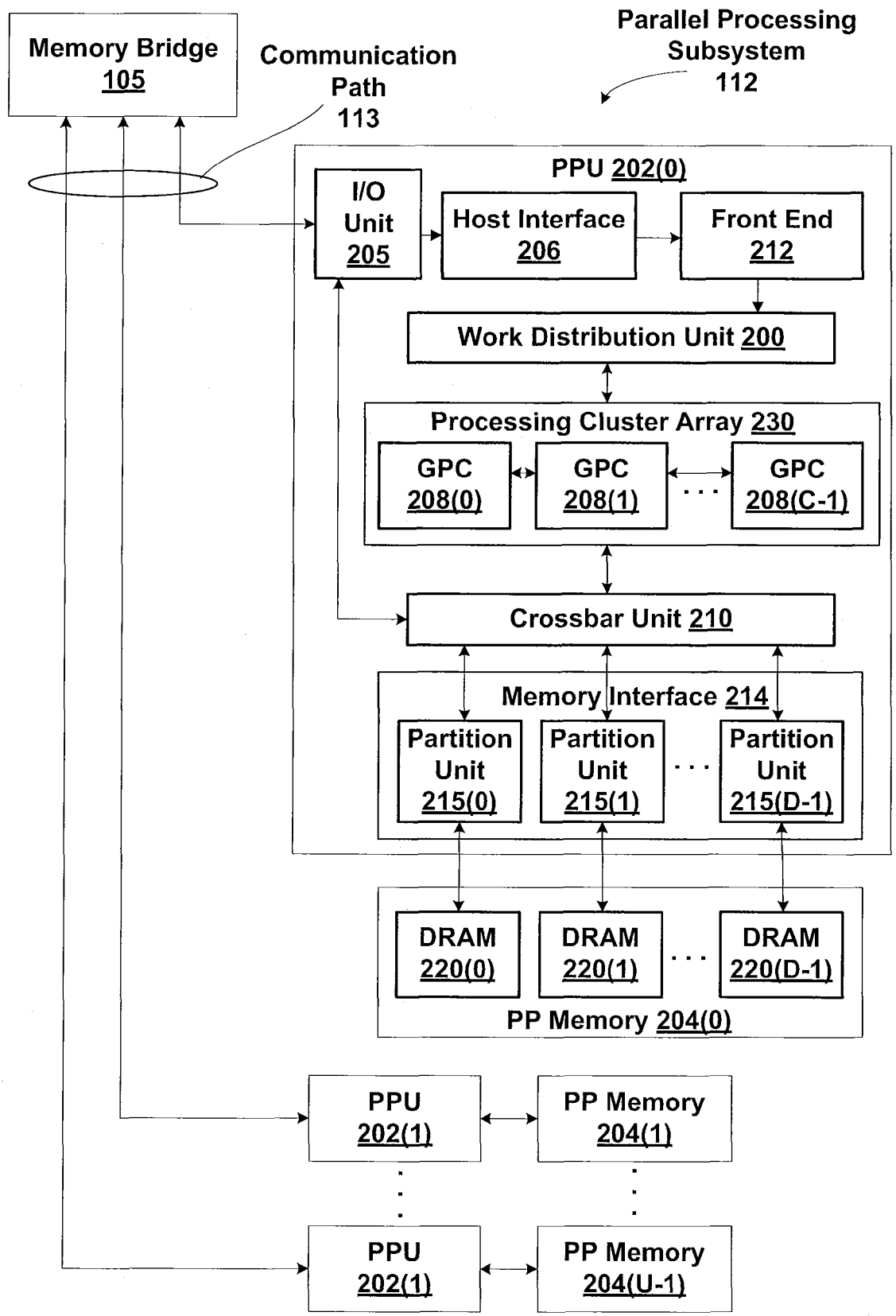
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
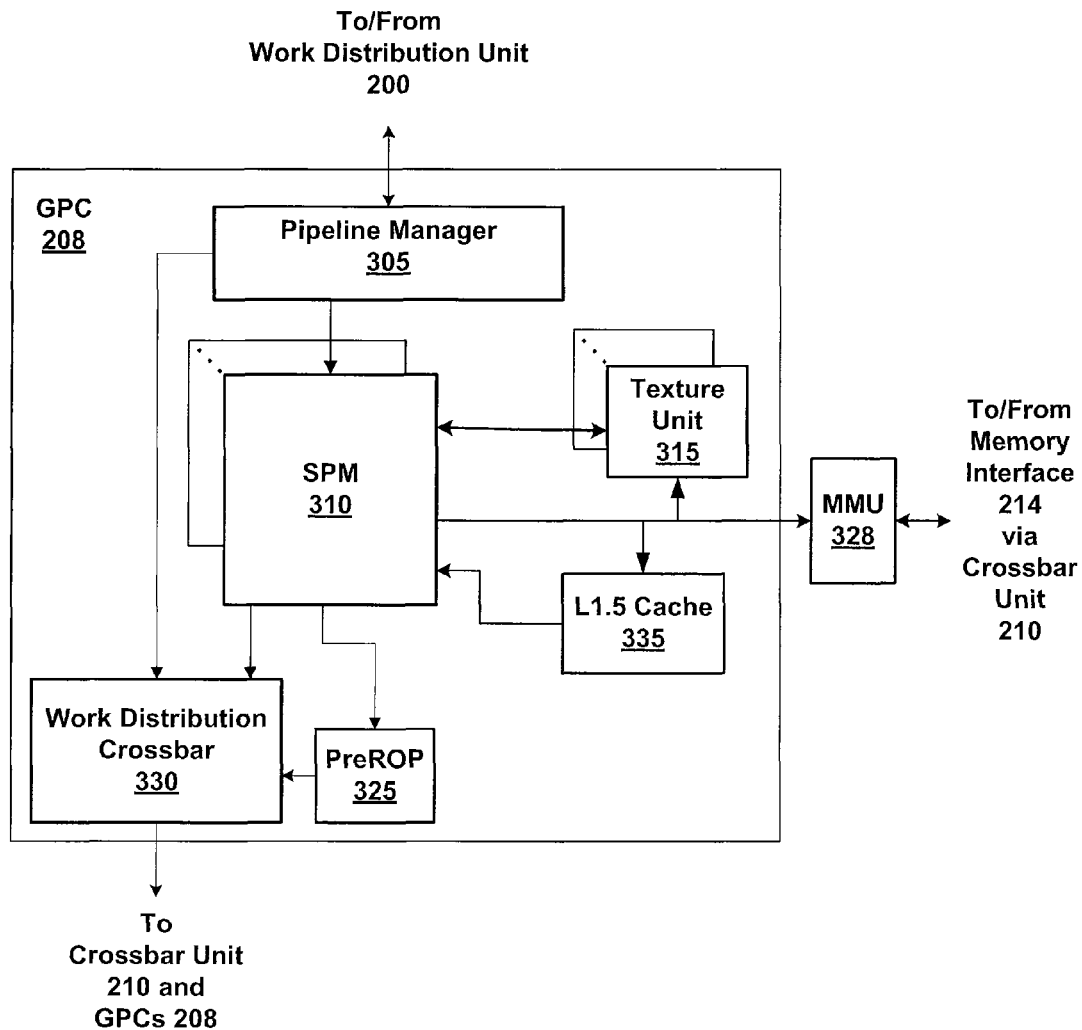
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to parallel thread processors called streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
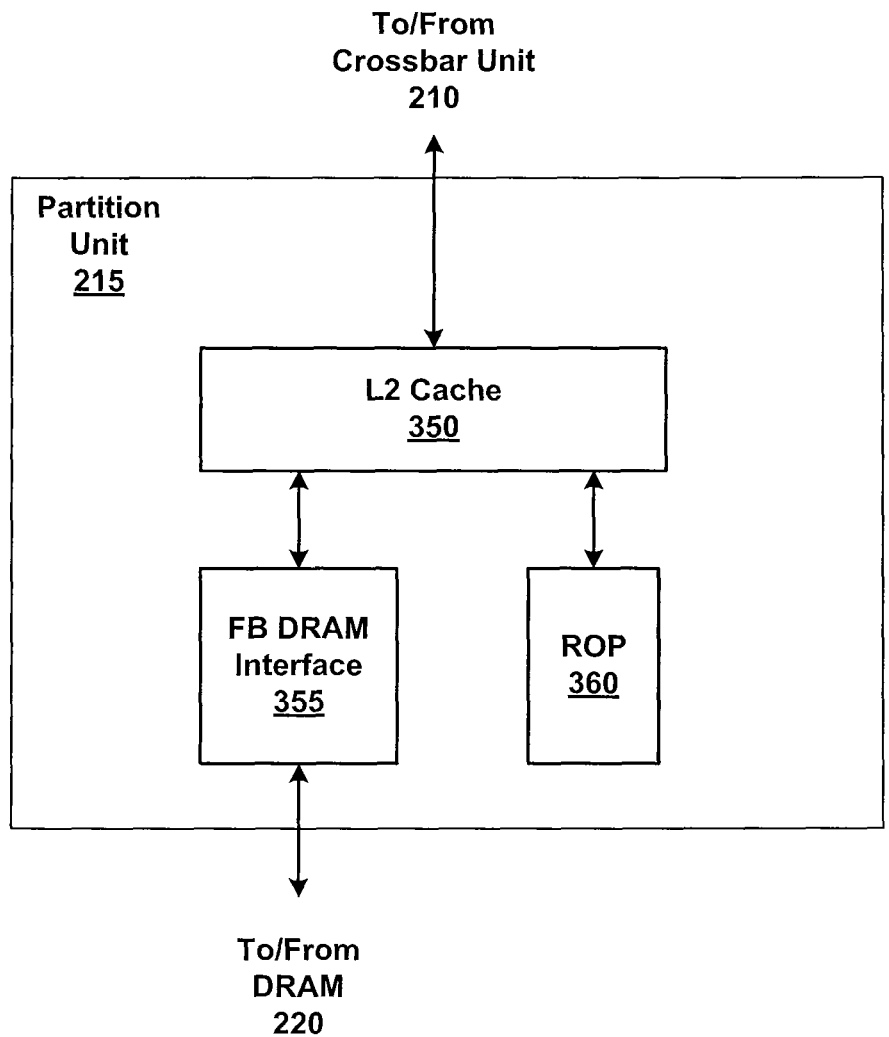
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in a thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
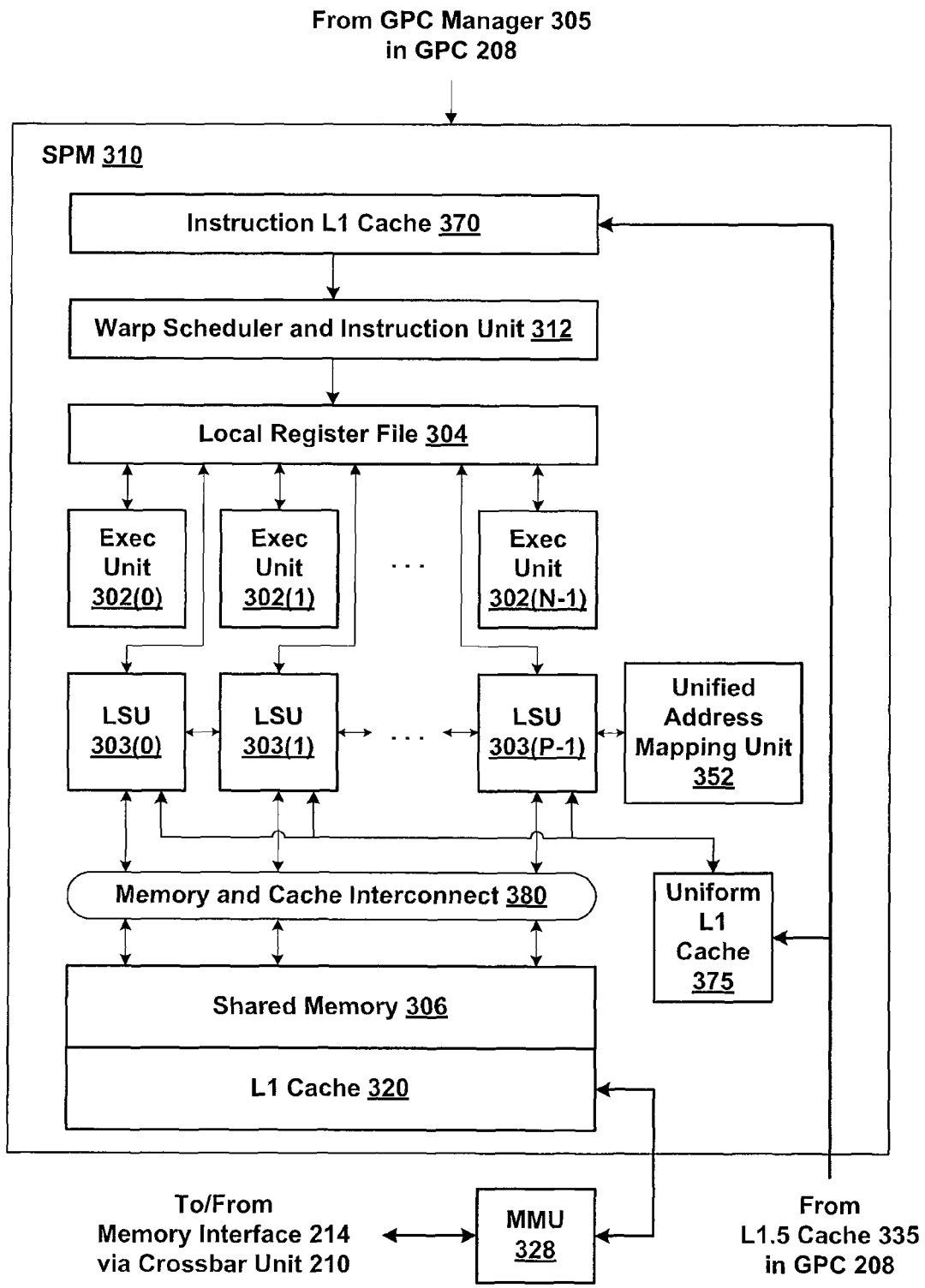
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
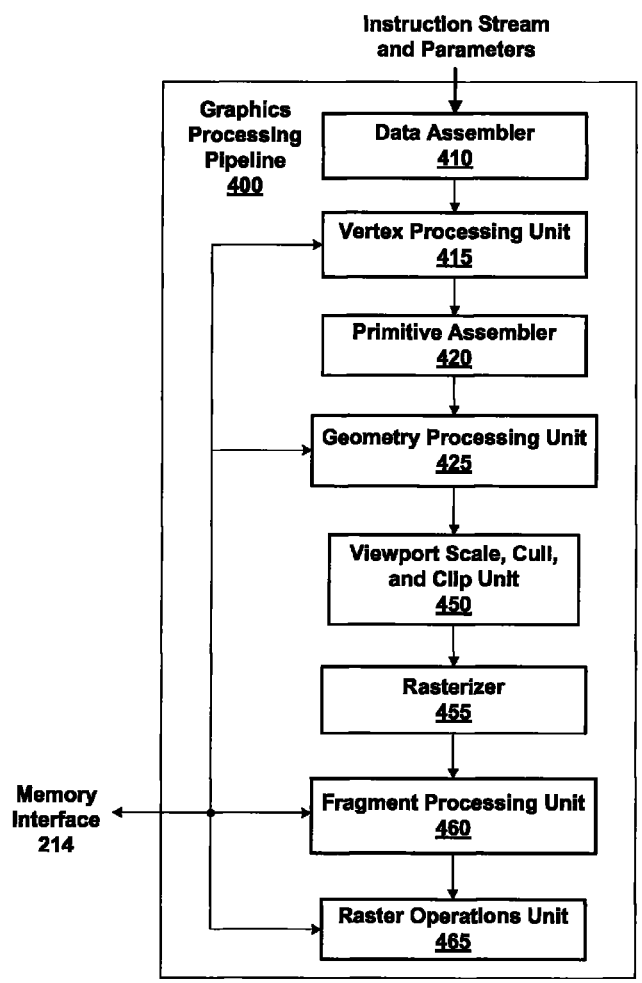
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Address Mapping for a Parallel Thread Processor

Parallel thread processor (streaming multiprocessor) SPM 310 implements a scheme to map addresses generated by each individual thread and relocate them to other addresses in a virtual address (VA) space. Embodiments refer to the thread address space as "GTAS" (generic thread address space) or unified address space.

Figure 5:
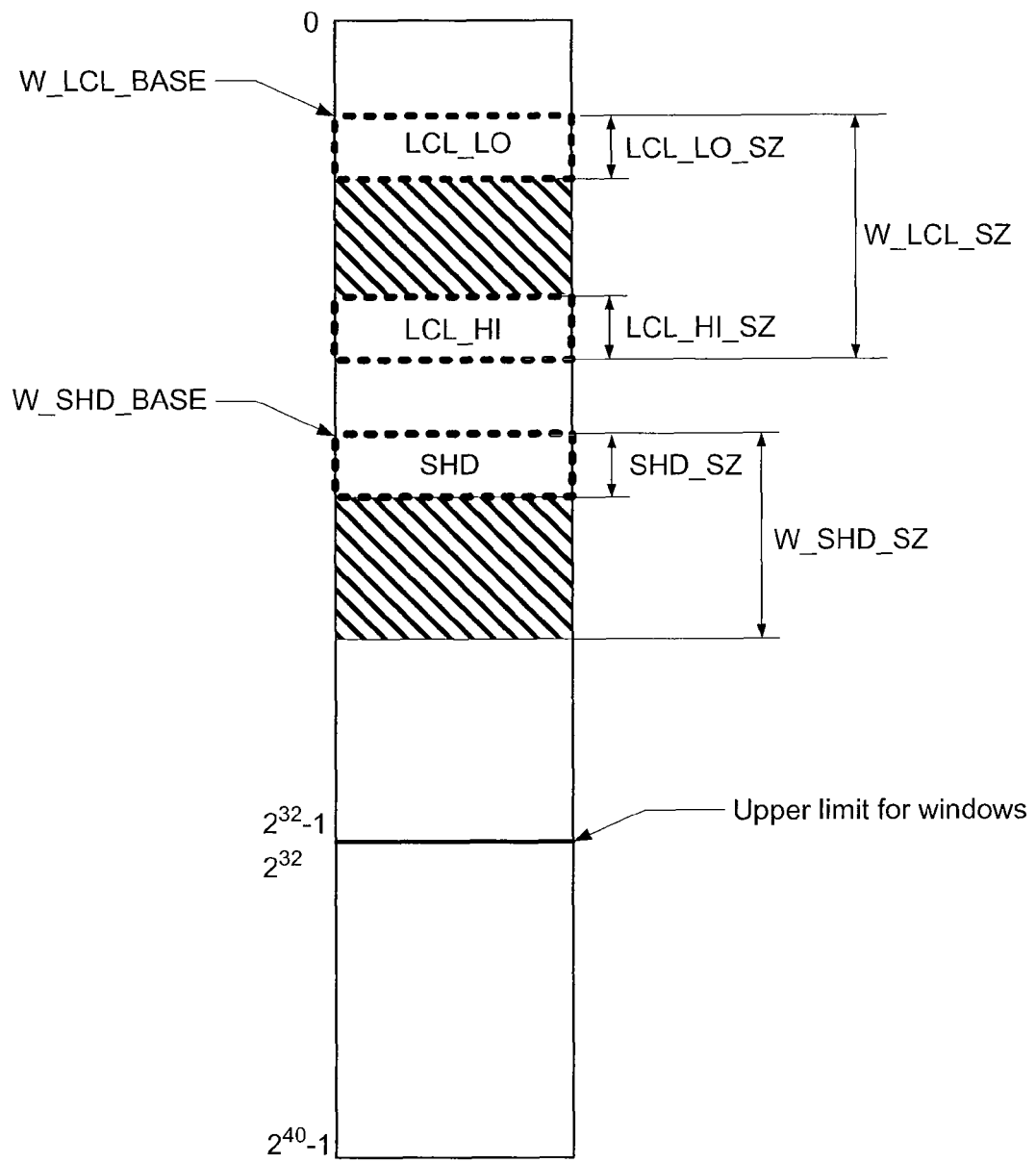
FIG. 5 is a conceptual diagram illustrating a generic thread address space (GTAS), according to one embodiment of the invention.

FIG. 5 is a conceptual diagram illustrating a generic thread address space (GTAS), according to one embodiment of the invention. As shown, within the GTAS, there are two "windows" within that space: a local (LCL) and shared (SHD) window. LCL corresponds to thread-local memory locations that are private to each thread. When an individual thread accesses an address in the thread-local LCL window of the generic thread address space using a load or store instruction, the GTAS address is mapped to a unique per-thread private region of memory associated with that thread. The mapping from generic thread address to a unique thread-local region is based on each thread's unique thread ID number, so that parallel programs can use the same thread-local GTAS address in all threads, and each thread accesses its own private per-thread memory region. The SPM load and store instructions perform the address mapping for thread-local (per-thread private) thread addresses, avoiding the need for instruction sequences to calculate a mapping from a generic thread address to a unique per-thread memory address. SHD corresponds to memory locations that are shared among threads of a CTA.

In some embodiments, one reason for windowing LCL and SHD this way is to enable CUDA applications to have a single pointer type that can reference any type of memory, LCL, SHD, or Global (GBL). Prior parallel thread processors required different instruction sequences to access each specific type of memory, which is inefficient. By enabling a pointer to reference any address space with a single load or store instruction using a (unified) generic thread address, subroutines can be written using one instruction sequence that is independent of which address space the subroutine references at execution time.

In some embodiments, a generic thread address space (GTAS) is mapped to a virtual address (VA) space. In one embodiment, the generic thread address space is a $2^{40}$ byte address space generated by SPM 310 address operations such as load and store instructions, and the virtual address space is a $2^{40}$ byte address space generated by an address mapping that determines the specific portion (window) of the generic thread address space being accessed by a thread executing in the SPM 310, and the resulting virtual address is input to the MMU 328 to access memory. As shown in FIG. 5, the different windows of the GTAS may include a local per-thread memory and a shared per-CTA shared memory. The local per-thread memory may be further divided into sub-windows for storage for per-thread data values and a per-thread stack.

Load (LD) and store (ST) instructions executed by a thread and received by the SPM 310 generate GTAS addresses with the exception of local memory specific LDL/STL instructions and shared memory specific LDS/STS instructions. The LDL/STL and LDS/STS instructions generate addresses that are offsets within the local per-thread and shared per-CTA windows of the generic thread address space. Various parameters may describe the different windows within the GTAS, such as a W_LCL_BASE, which refers to the position within the GTAS of the local per-thread window, and a W_LCL_SZ, which refers to the size of the local per-thread window. In some embodiments, the W_LCL_BASE position is aligned on a 16 MB boundary and is set by system software. Also, in some embodiments, the W_LCL_SZ is a fixed 16 MB value and the LCL window is restricted to the first 4 GB of the GTAS. The LCL window spaces are mapped to storage in the virtual address space.

Within the LCL window, two sub-windows, i.e., a LCL_LO sub-window and LCL_HI sub-window, are used for the storage of thread-local per-thread data values and the per-thread stack, respectively. Software sets the thread-local memory size parameters LCL_LO_SZ and LCL_HI_SZ to specify the sizes of per-thread private LCL_LO and LCL_HI windows. The two sizes may be in increments of 16 bytes and may use a minimum value of 0 bytes and a maximum value of 512 KB per thread.

Within the LCL window, there may be three address ranges defined by the LCL_LO and the LCL_HI windows. GTAS addresses in the range W_LCL_BASE to W_LCL_BASE+ x.LCL_LO_SZ–1 are decoded as LCL_LO references unless the sub-window is disabled (i.e., when x.LCL_LO_SZ is zero). GTAS addresses between W_LCL_BASE+x. LCL_LO_SZ and W_LCL_BASE+W_LCL_SZ–1 are decoded as illegal references since those addresses do not lie in either the LCL_LO or the LCL_HI window. GTAS addresses between W_LCL_BASE+W_LCL_SZ–x. LCL_HI_SZ and W_LCL_BASE+W_LCL_SZ–1 are decoded as LCL_HI references unless the sub-window is disabled (i.e., when x.LCL_HI_SZ is zero). Finally, generic GTAS addresses not falling within any window are treated as global virtual addresses and are left unchanged when mapped to the virtual address space.

One embodiment uses 16 MB (24-bit) window sizes for local window and shared window in a 1 TB (40-bit) GTAS. The memory access instructions (load and store) use 64-bit registers to hold 40-bit unified memory space addresses, with zeros in the most-significant 24 bits. In some embodiments, local window and shared window may be aligned to 16 MB boundaries, equal to the window size, to simplify the hardware implementation. Various other embodiments may use different window sizes as needed.

SPM 310 uses single-instruction multiple-thread (SIMT) techniques described above to execute an instruction for a group of parallel threads called a warp or "thread group". The embodiment described here groups 32 threads together in each warp, such that a load or store instruction groups together 32 individual thread addresses, one address associated with each individual thread. A thread-local access by each individual thread in a warp to the same local address is received by the SPM as a group of 32 identical per-thread addresses, which it maps to 32 different unique per-thread memory locations using each thread's unique thread ID number. For efficiency of accessing the L1 cache and the memory, the SPM maps the 32 local per-thread addresses of each warp to adjacent virtual addresses in an interleaved fashion so that they fall into a minimal number of L1 cache lines. SPM groups per-thread local memory addresses into per-warp addresses, corresponding with the way it groups individual threads into warps. System software allocates a region of virtual memory to each SPM to hold the contents of each thread's local private memory, which is organized into blocks of memory allocated to each thread group (warp). The SPM maps each generic thread address for a per-thread local address to the virtual address assigned to that thread and warp by the GTAS to VA mapping.

The default size of virtual memory that is allocated for thread-local memory for each thread group (warp) is determined using a parameter D_WARP_MEM_SZ, that is set by system software. The D_WARP_MEM_SZ may be specified in increments of 512 bytes with a range of zero to 33 MB. In one embodiment, the actual amount of virtual address space memory allocated per thread group is determined by the following equation:

$$shRequired = 32*(x.LCL\_LO\_SZ + x.LCL\_HI\_SZ) + x.CRS\_SZ$$

$$WARP\_LCL\_SZ = \max(D\_WARP\_MEM\_SZ, shRequired)$$

x.CRS_SZ refers to the size of the call-return-synchronization stack. The value WARP_LCL_SZ is recomputed by the device driver 103 each time any shader is rebound, i.e., bound again. If the value changes due to a rebind, any SPM 310 will be flushed prior to running shaders with the new allocation.

Figure 6:
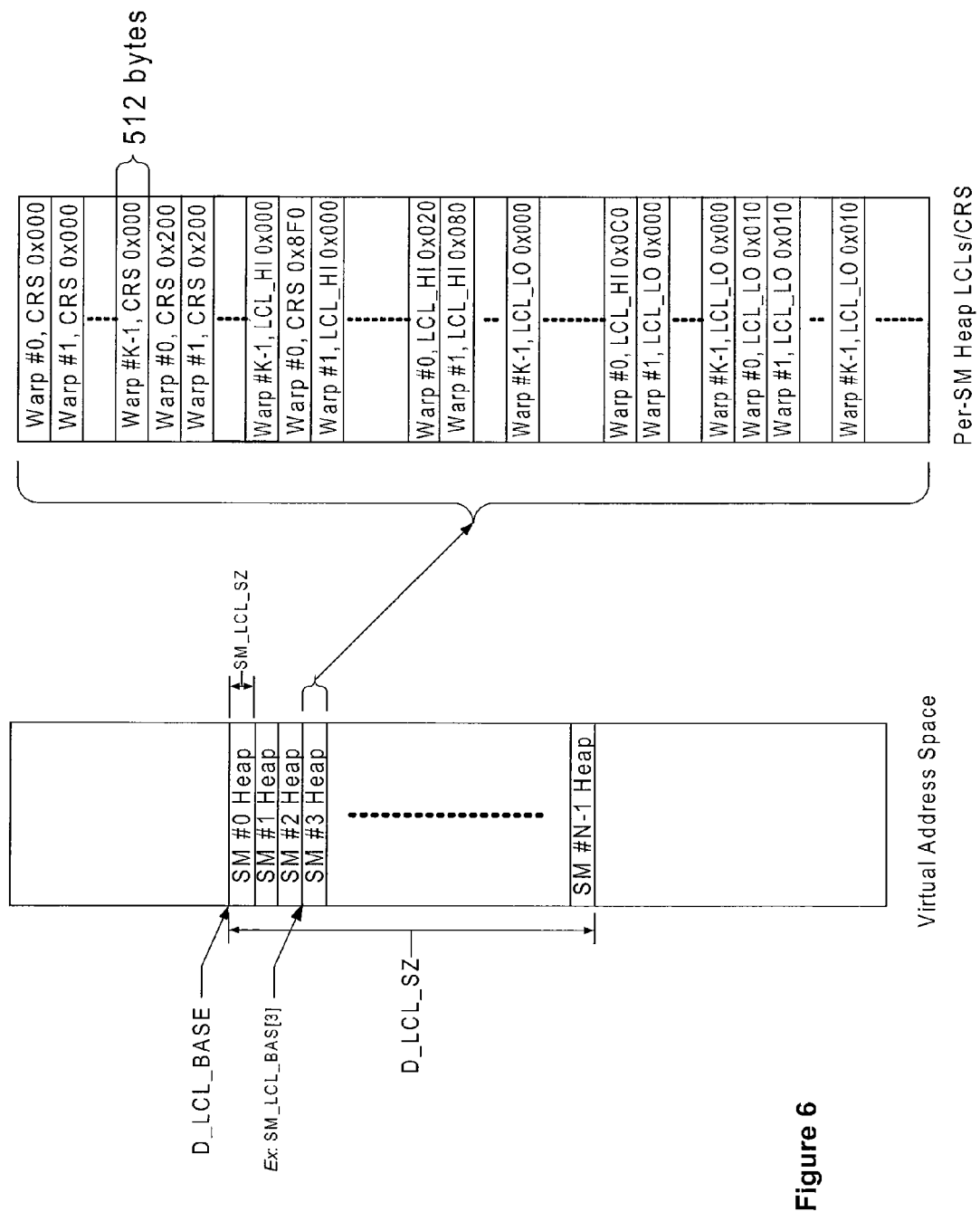
FIG. 6 is a conceptual diagram illustrating a virtual address space, according to one embodiment of the invention.

FIG. 6 is a conceptual diagram illustrating a virtual address space, according to one embodiment of the invention. The two sub-windows LCL_LO and LCL_HI are relocated to a SPM-specific and thread group (warp)-specific section of the virtual address space. The device driver 103 allocates a single contiguous heap for the LCL memory within the virtual address space. The base of this heap is a software-set parameter, D_LCL_BASE. The size of the heap is a software-set parameter D_LCL_SZ. In one embodiment, D_LCL_BASE is aligned on a 4 KB boundary and D_LCL_SZ is in increments of 128 KB up to a maximum of 128 GB (i.e., 37 bits effective, 20 bits actual). Each SPM 310 is allocated a fixed chunk of this heap of size SM_LCL_SZ at a location SM_LCL_BASE[n] for logical SPM identifier 'n.' The fixed chunk size and location is computed by the device driver 103 using the following equations:

SM_LCL_SZ=floor(D_LCL_SZ/NUM_SM) and

SM_LCL_BASE[n]=n*SM_LCL_SZ+D_LCL_BASE.

The chunk size may be continuously evaluated against the minimal requirement per thread group to compute the maximum number of thread groups that can run on the particular SPM 310 based on a maximum number of thread groups that an SPM 310 can execute simultaneously which may be limited by the amount of available per-CTA shared memory space.

The SPM 310 LCL heap is further subdivided into two or more sections, in particular a LCL_LO, and a LCL_HI. Each section may consist of a set of 512 byte blocks interleaved on a per-thread group basis, with NWARPS being the repeat rate, as described in conjunction with FIG. 5B. NWARPS refers to the number of warps that can be executed by an SPM. In some embodiments, NWARPS is not a power of two. The GTAS is interleaved in this fashion to distribute memory accesses from each SPM 310 across the different FB DRAM partitions and avoid having multiple warps in multiple SPMs 310 access the same FB DRAM partition at the same time (i.e., avoid camping on a memory partition).

Figure 7:
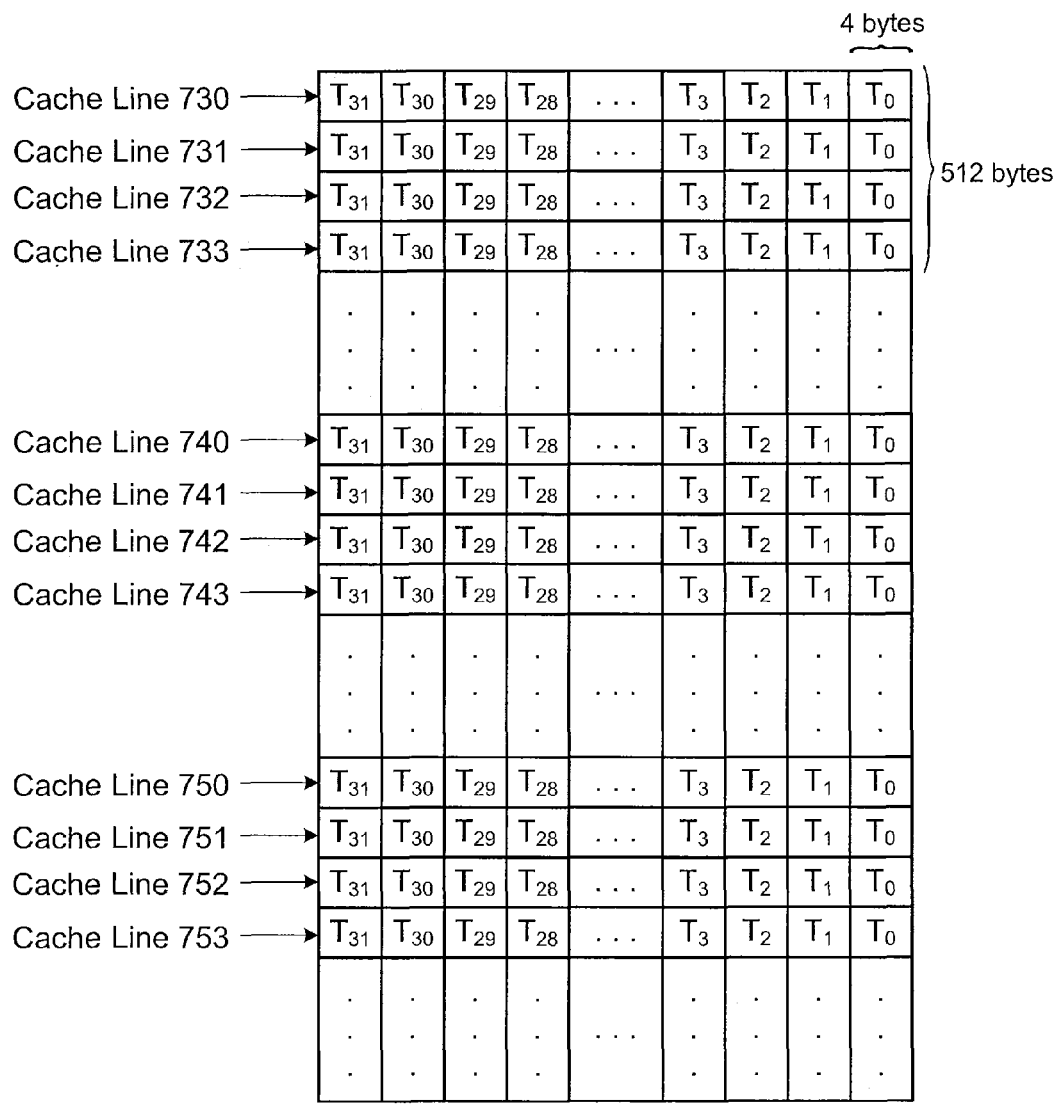
FIG. 7 is a conceptual diagram of a 512-byte block of memory interleaved on a per-thread group basis, according to one embodiment of the invention.

FIG. 7 is a conceptual diagram of a 512-byte block of memory interleaved on a per-thread group basis, according to one embodiment of the invention. In some embodiments, the memory may be cached. Each cache line stores data for each thread in one thread group. In one embodiment, each cache line stores 128 bytes of data, so a cache line stores 4 bytes of data for each thread when there are 32 threads in a thread group. The data for a particular thread group is interleaved with data for the other thread groups at the granularity of 512 byte blocks. For example, cache lines 730-733 may store data for each thread in a first thread group, cache lines 740-743 may store data for each thread in a second thread group, cache lines 750-753 may store data for each thread in a third thread group. Accordingly, the 512-byte blocks are interleaved on a per-thread group basis, as also shown in on the right side of FIG. 6.

In some embodiments, each thread accessing a GTAS memory computes a 40-bit thread address (TA). To access physical memory, the GTAS address is converted to a virtual address, which then refers to a unique memory location per SPM.

First, the unified address mapping unit 352 determines whether the GTAS address refers to the LCL_LO portion or the LCL_HI portion of the LCL window. Based on this determination, the thread address (TA) is converted into an effective address (EA), by performing the following computation:

TABLE 1

```
if (window == LCL_LO)
    EA = TA - W_LCL_BASE;
else   // (i.e., window == LCL_HI)
    EA = TA - W_LCL_BASE - W_LCL_SZ;
```

The thread address (TA) is converted into an effective address (EA) by subtracting a base address for the LCL window (W_LCL_BASE) from the thread address. The effective address may also be generated directly via the LDL and STL instructions. Effective addresses that are within the LCL window are converted to a value compatible with the virtual address space. To do so, an effective address (EA) is scaled and offset to create an address within a conceptual address space associated with the thread group (warp), herein called a warp address space address (WASA), using the following equations:

TABLE 2

Temp = (EA[18:2] << 7) + (threadID[4:0] << 2) + EA[1:0]
WASA = Temp + (LCL_HI_SZ × 32 + CRS_SZ), where threadID[4:0] is the thread identifier for a specific thread in the thread group. In essence, a particular 4-byte memory location within the 512-byte block shown in FIG. 7 can be identified by four bits, e.g., the four lowest order bits in the EA. To calculate WASA, the intermediate Temp address is calculated. As shown, the two lowest order bits of the EA are passed through directly to Temp and WASA. Then, the remainder of the EA is shifted by 5 bits to make room for a 5-bit threadID that is inserted into the Temp address. Then, the Temp address is added to (LCL_HI_SZ×32+CRS_SZ), representing a base address of the WASA address space. The insertion of thread ID (threadID) is required to make each WASA address a per-thread unique address.

The WASA address, then, needs to be converted to a per-SPM virtual address. The protocol between the L1 and the SPM units with respect to LCL memory accesses is described herein. The SPM passes the WASA-based addresses and a warp ID to the L1 for each LCL access the SPM makes. The L1 caches LCL memory using a tag that is the concatenation of the warp ID and WASA address. Upon a cache miss, the L1 converts the WASA to a true virtual address:

TABLE 3

VA = (WASA[25:9] * NWARPS + warpID) × 512 +
SM_LCL_BASE[n] + WASA[8:0]

where 'n' is the SM logical ID. The VA is then converted into a physical address used to access memory. In some embodiments, by employing a WASA-based address, the SPM 310 can defer or avoid the final virtual address computation until after determining whether or not a cache hit occurred for a memory access. Since the final address computation is done after a cache miss, the calculation can be performed at much lower comparable bandwidth (and cost) than if the calculation had been done prior to the L1 cache 320.

Figure 8:
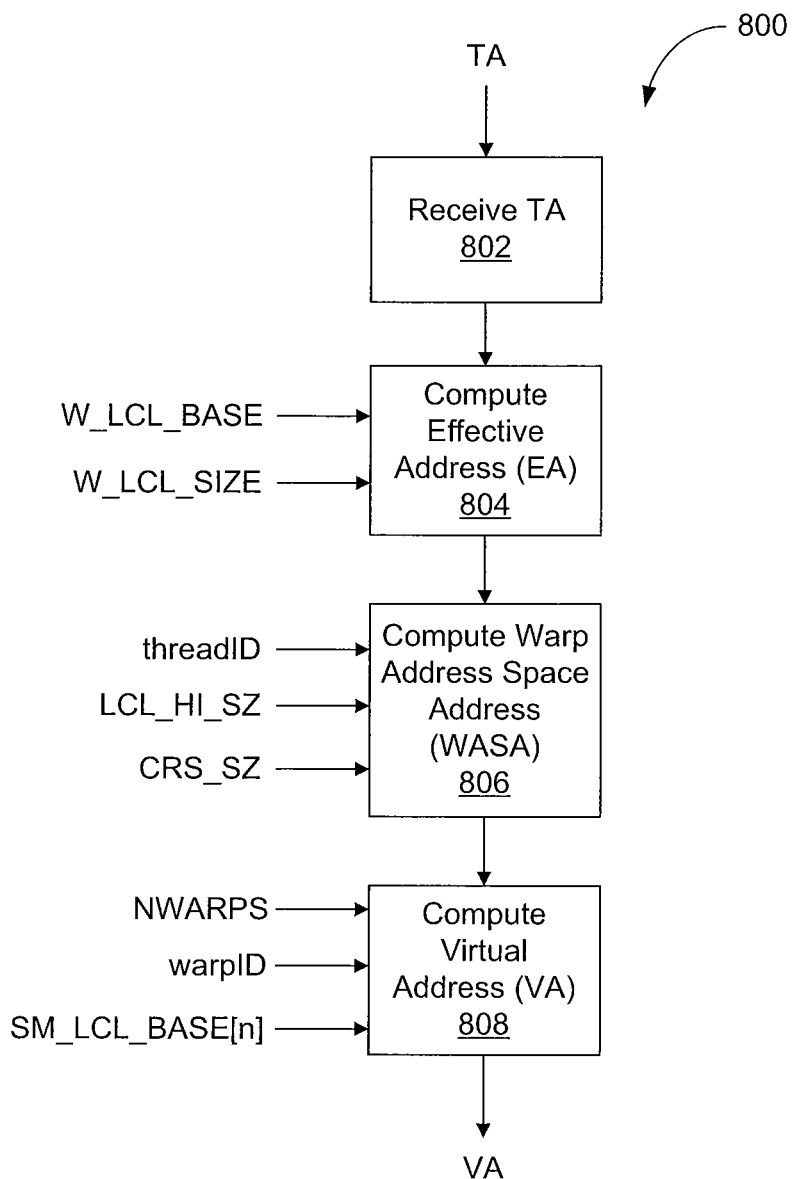
FIG. 8 is a flow diagram of method steps for computing a virtual address from a per-thread address to access per-thread local memory, according to one embodiment of the invention.

FIG. 8 is a flow diagram of method steps for computing a virtual address from a per-thread address to access per-thread local memory, according to one embodiment of the invention. Persons skilled in the art will understand that, even though the method 800 is described in conjunction with the systems of FIGS. 1-7, any system configured to perform the method steps, in any order, is within the scope of embodiments of the invention.

As shown, the method 800 begins at step 802, where the unified address mapping unit 352 receives a thread address (TA). The TA may be part of a Load or Store instruction included in a first thread. As described, when implementing unified addressing, instructions enable programming languages to efficiently access multiple parallel memory spaces with a unified pointer reference and one unified memory access instruction. The unified pointer reference, however, needs to be mapped to a unique memory location associated with the first thread.

At step 804, the unified address mapping unit 352 computes an effective address (EA) based on the TA and W_LCL_BASE and W_LCL_SIZE. As described above, the W_LCL_BASE refers to a base location for window of local per-thread memory. W_LCL_SIZE refers to the size of the local per-thread window. The methodology for calculating EA, in one embodiment, is described in Table 1, above.

At step 806, the unified address mapping unit 352 computes a conceptual warp address space address (WASA) based on the EA and a threadID, LCL_HI_SZ, and CRS_SZ. The methodology for calculating WASA, in one embodiment, is described in Table 2, above. The WASA address, in one embodiment, is unique per thread group (i.e., per warp).

At step 808, the unified address mapping unit 352 computes a virtual address (VA) based on the WASA, NWARPS, warpID, and SM_LCL_BASE[n]. The methodology for calculating VA, in one embodiment, is described in Table 3, above. The VA address, in one embodiment, is unique per SPM. The VA is then converted into a physical address used to access memory.

In sum, embodiments of the invention provide a hardware-based address mapping technique for a unified addressing scheme. Each thread executing within an SPM can access a private thread-local memory using a unified thread address. The thread address is then mapped to a unique virtual address used to access memory.

Advantageously, unifying the addressing of multiple distinct parallel memory spaces into a single address space enables the use of a single type of load or store instruction instead of a different type of load and store instruction for each of the distinct parallel memory spaces. It enables parallel thread processors having multiple different address spaces to be programmed efficiently with conventional single-thread programming languages such as C that assume a single memory address space and a single type of pointer address.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for thread address mapping in a parallel thread processor, the method comprising:
   receiving a thread address associated with a first thread in a thread group;
   computing an effective address based on a location of the thread address within a local window of a thread address space;
   computing a thread group address in an address space associated with the thread group based on the effective address and a thread identifier associated with a first thread; and
   computing a virtual address associated with the first thread based on the thread group address and a thread group identifier, wherein the virtual address is used to access a location in a memory associated with the thread address to load or store data.

2. The method of claim 1, wherein computing the effective address comprises subtracting a base address associated with the local window from the thread address.

3. The method of claim 1, wherein computing the thread-group address comprises generating a temporary address based on shifting one or more bits of the effective address and inserting the thread identifier to form a temporary address.

4. The method of claim 1, wherein computing the virtual address is further based on a number of thread groups executed by the parallel thread processor.

5. The method of claim 4, wherein the number of thread groups is not equal to a power of two.

6. The method of claim 1, wherein blocks of data associated with a first thread group are interleaved with blocks of data associated with a second thread group when stored in the memory.

7. The method of claim 6, wherein each block of data associated with a thread group is interleaved on a per-thread basis.

8. The method of claim 7, wherein each block of data associated with a thread group comprises 512 bytes of data that are interleaved on a per-thread basis in 4-byte portions.

9. A computer system for performing thread address mapping, the computer system comprising:
   a parallel thread processor configured to:
      receive a thread address associated with a first thread in a thread group,
      compute an effective address based on a location of the thread address within a local window of a thread address space,
      compute a thread group address in an address space associated with the thread group based on the effective address and a thread identifier associated with a first thread, and
      compute a virtual address associated with the first thread based on the thread group address and a thread group identifier, wherein the virtual address is used to access a location in a memory associated with the thread address to load or store data.

10. The computer system of claim 9, wherein computing the effective address comprises subtracting a base address associated with the local window from the thread address.

11. The computer system of claim 9, wherein computing the thread-group address comprises generating a temporary address based on shifting one or more bits of the effective address and inserting the thread identifier to form a temporary address.

12. The computer system of claim 9, wherein computing the virtual address is further based on a number of thread groups executed by the parallel thread processor.

13. The computer system of claim 12, wherein the number of thread groups is not equal to a power of two.

14. The computer system of claim 9, wherein blocks of data associated with a first thread group are interleaved with blocks of data associated with a second thread group when stored in the memory.

15. The computer system of claim 14, wherein each block of data associated with a thread group is interleaved on a per-thread basis.

16. The computer system of claim 15, wherein each block of data associated with a thread group comprises 512 bytes of data that are interleaved on a per-thread basis in 4-byte portions.

17. A non-transitory machine-readable storage medium storing instructions that, when executed by a processor, cause a computer system to perform thread address mapping in a parallel thread processor, by performing the steps of:
   receiving a thread address associated with a first thread in a thread group;
   computing an effective address based on a location of the thread address within a local window of a thread address space;
   computing a thread group address in an address space associated with the thread group based on the effective address and a thread identifier associated with a first thread; and
   computing a virtual address associated with the first thread based on the thread group address and a thread group identifier, wherein the virtual address is used to access a location in a memory associated with the thread address to load or store data.

18. The machine-readable storage medium of claim 17, wherein computing the effective address comprises subtracting a base address associated with the local window from the thread address.

19. The machine-readable storage medium of claim 17, wherein computing the thread-group address comprises generating a temporary address based on shifting one or more bits of the effective address and inserting the thread identifier to form a temporary address.

20. The machine-readable storage medium of claim 17, wherein computing the virtual address is further based on a number of thread groups executed by the parallel thread processor.

* * * * *